United States Patent

[11] 3,613,077

[72] Inventor George David Forney, Jr.
Lexington, Mass.
[21] Appl. No. 852,539
[22] Filed Aug. 25, 1969
[45] Patented Oct. 12, 1971
[73] Assignee Codex Corporation
Watertown, Mass.

[54] ERROR CORRECTION IN SAMPLED-DATA CIRCUITS
11 Claims, 9 Drawing Figs.

[52] U.S. Cl. ..................................... 340/146.1,
325/38 R, 325/41, 328/162
[51] Int. Cl. ........................................ G08c 25/00
[50] Field of Search .......................... 340/146.1;
325/41, 42, 38; 328/162

[56] References Cited
UNITED STATES PATENTS

| | | | |
|---|---|---|---|
| 3,457,510 | 7/1969 | Lender | 325/38 |
| 3,388,330 | 6/1968 | Kretzmer | 325/42 |
| 3,414,819 | 12/1968 | Lucky | 328/162 X |
| 3,414,845 | 12/1968 | Lucky | 325/41 X |
| 3,478,266 | 11/1969 | Gardenhire et al. | 324/38 |
| 3,492,578 | 1/1970 | Gerrish et al. | 325/42 |
| 3,502,986 | 3/1970 | Lucky | 325/42 X |

OTHER REFERENCES
J W. Smith, " Error Control in Duobinary Systems by Means of Null Zone Detection," IEEE Trans. Comm. Tech. COM- 16, 825– 830, Dec. 1968.

Primary Examiner—Malcolm A. Morrison
Assistant Examiner—Charles E. Atkinson
Attorney—John Noel Williams ABSTRACT: Error correction in modems and similar sampled-data circuits that have outputs representable as outputs of a linear circuit with integer-valued impulse response when the integer-valued input sequence is subject to predetermined constraints. Integer-valued tentative decisions and reliability information are formed and stored. A correction is made upon detection, on the basis of the constraints, of an error in the tentative decisions. Shown also are: an inverse linear circuit for detecting decision errors according to whether its outputs satisfy the constraints, with means to combat propagation of the error in the inverse circuit; reliability information in the form of magnitude and sign of apparent errors, especially storing only the extreme values of apparent errors in the sequence under review; constraints in form of predetermined finite range of integers and detection with an inverse circuit on basis of values falling outside of the finite range, also combating propagation by replacement of erroneous value with closest substitute satisfying the constraints; and impulse responses of the form $1 \pm D^n$, where $n$ = integer, and division of tentative decisions and memory into related groups.

ERROR CORRECTION IN SAMPLED-DATA CIRCUITS

This invention relates to error correction in modems, i.e., the transmit and receive devices which convert source data into form for transmission and reconvert it into its original form, and similar devices.

The invention described herein is useful with linear sampled-data information transmission channels. Such channels are defined as those in which data samples occur at discrete times, and there is a signal at the receiver which can be represented as the sum of (1) the input sequence passed through some linear circuit and (2) noise. A linear circuit is herein defined as a circuit for which unlimited arbitrary scaling at the input produces identical output scaling and the superposition of input sequences produces an output sequence which equals the superposition of the individual output sequences which would obtain for each input sequence separately.

For various reasons, well known in the art, it is often desirable or necessary to employ linear circuits which have an "imperfect impulse response." A linear sampled-data system is said to have a perfect discrete-time response when an input of a single impulse, represented by the sequence...0, 0, 0, 1, 0, 0, 0, ...leads to a system output sequence of identical form. If the system input at time $i$ is denoted $x_i$, and the system output at time $i$ is denoted $z_i$, then for the perfect response case $z_i=x_i$. An example of an imperfect response (also called "partial response") is the following: $z_i=x_i-x_{i12}$. This corresponds to an impulse response of...0, 0, 0, 1, 0, −1, 0, 0, 0...All imperfect impulse responses discussed herein will be of the form representable as integer-valued. That is, each number in a sequence like that immediately above can be made an integer by appropriate scaling.

In view of the foregoing it is an object of the invention to correct errors occurring in a linear sampled-data information transmission system having an imperfect impulse response.

In accordance with the invention error correction apparatus is provided in a modem or a similar device in which there are time-discrete samples which are representable as the sum of a desired output plus noise, where the noise is likely to be small compared to a unit interval between sample levels. The desired output should be at least representable as the output of a linear sampled-data circuit with integer-valued impulse response when the input to that linear circuit is a sequence of integer-valued input samples subject to predetermined constraints. The error corrector according to the invention includes a tentative decision circuit responsive to the data samples and having as outputs integer-valued tentative decisions and indications of the reliability of those tentative decisions. A detection circuit examines the tentative decisions and detects the occurrence of decision errors on the basis of the aforementioned constraints. Memory means are provided for storage of preceding tentative decisions and of reliability information which comprises at least an indication of the location of the least reliable of the stored tentative decisions. The error corrector correction logic is responsive to the detection circuit and to the stored reliability information for correction of one of the stored tentative decisions when an indication of the decision error is received from the detection circuit.

In preferred embodiments of the invention the above-mentioned detection circuit comprises a linear circuit which is the inverse of the linear sampled-data circuit by which the channel may be represented. This inverse circuit is connected to receive the tentative decisions as inputs and, because it is the inverse of the first-mentioned linear circuit, its outputs, in the absence of decision errors, will be identical to the inputs to the channel so that the input constraints may be applied without any translation to determine the presence of errors in the tentative decisions. It is also preferred that the stored reliability information be either the sign and magnitude of the largest positive and negative apparent errors associated with the stored tentative decisions or all of the signs and magnitudes of the apparent errors being equal to the difference between the data samples and the levels associated with the corresponding tentative decisions.

Other objects, features, and advantages will appear from the following description of a preferred embodiment, taken together with the attached drawings thereof, in which.

In the preferred embodiment illustrated in the accompanying drawings and described in detail below the partial response of the system is defined as $z_i=x_i-x_{i12}$, where these symbols are as defined above. It will be demonstrated, however, that the invention may be adapted to systems having differently defined partial responses.

Figure 1:
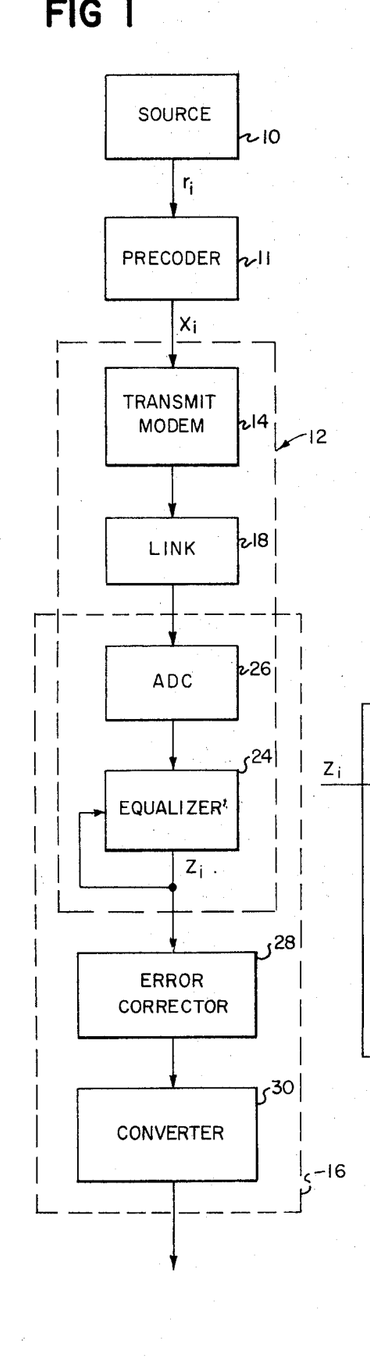
FIG. 1 is a schematic illustration of a data transmission system including a receiver modem having error correction apparatus.

FIG. 1 illustrates the relation of an error correcting modem according to the invention to the remainder of the information system. As shown therein, N–level raw data, $r_i$ from a source 10 is precoded in precoder 11 the outputs of which, $x_i$, are discrete time samples on N levels (e.g., amplitude levels), with respect to the carrier, equal to C, C+1, C+2,...C+N−1. In the specific embodiment to be described $N=4$ and $C=0$. The inputs $x_i$ to the linear circuit 12 are thus four-level integer-valued data having values of 0, 1, 2, 3.

As discussed above, the linear circuit 12 comprises transmit modem 14, the channel or link 18, a portion of receive modem 16, and the noise injected into the data during transmission. The output of the linear circuit 12 may be represented as $z_i=x_i-x_{i1}+n_i$, reflecting the desired output of the partial response of the system as defined above and the injection of noise, $n_i$, into the data stream where $n_i$ includes any residual intersymbol interference. Given the above representation for $z_i$ and the values of $N$ and $C$, it can easily be shown that the system outputs, in the absence of noise, are integers in the range −(N−1) to (N−1). Thus the four-level $x_i$ input alphabet is converted by linear circuit 12 into a seven-level output alphabet having integer values from −3 to +3.

Figure 1A:
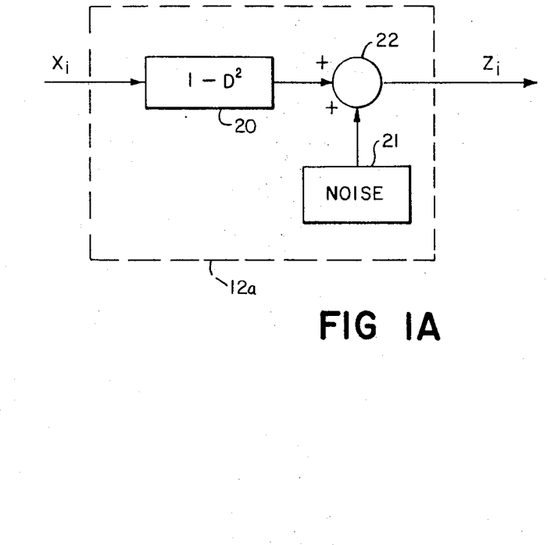
FIG. 1a is a schematic illustration of an idealized circuit equivalent to a portion of the system of FIG. 1.

An idealized equivalent circuit 12a of the linear circuit 12 is illustrated in FIG. 1a, where the box 20 merely indicates the partial response of the linear circuit and the summation element 22 adds the noise 21 to the output of box 20. It is this idealized case, with the noise component small, with which the error corrector according to the invention is designed to operate. To achieve this case, in view of the time-varying characteristics of practical channels, the portion of receive modem 16 which, in the model, is a part of the linear circuit 12 includes an equalizer 24, following the conventional analogue-to-digital converter 26. The equalizer 24 is preferably of the adaptive type so as to permit continuous data transmission in the presence of time-variant channels. The error corrector 28 follows the equalizer 24 and conventional retreival of the four-level data occurs thereafter in converter 30 to provide the final output.

By incorporating the error corrector in a modem it can share portions of the modem decision logic as well as power supply and timing.

In a system with a perfect response the $z_i$ output alphabet has the same number of levels as the $x_i$ input alphabet. Since a partial response system has more output levels for the same number of input levels, the output levels are more closely bunched when transmitted power is the same, with the result that it becomes more susceptible to noise. Thus there is an inherent inefficiency in any data transmission system having a partial response, in that greater power is required to obtain the equivalent output alphabet spacing than with a perfect response. The decoder to be described uses some of the excess power required to detect and correct errors.

DETECTION OF DECISION ERRORS

The discussion of the error detection scheme is facilitated by the use of an operator notation for the partial response of linear circuit 12. A delay operator, $D$, is employed. Recasting the system equation in terms of delay operator $D$, the output of the linear circuit 12 may be defined as $z(D)=x(D)g(D)$. The factor $g(D)$ is called the transfer function of the linear circuit. For the specific partial response under discussion (i.e.,...0 0, 0, 1, 0,−1, 0, 0, 0...) $g(d)=1-D^2$.

For every linear circuit there exists an inverse linear circuit. Thus for linear circuit 12 of FIG. 1 having the transfer function $g(D)=1-D^2$ the inverse linear circuit would have the transfer function $g^{11}(D)=1/(1-D^2)=1+D^2+D^4+D^6+....$ 2

In the absence of decision errors, the inverse of a linear circuit, when placed in series with the linear circuit, will yield an output identical to the input of the original linear circuit.

Since, in the system described, the inputs are in a finite range and are spaced by integers, if an inverse linear circuit were to follow linear circuit 12, the output of that inverse linear circuit would indicate that a decision error had been made if the output were to fall outside of the allowable range as defined by the range of inputs to the linear circuit.

The use which is made of the foregoing input constraints and of the existence of an inverse linear circuit for linear circuit 12 will now be considered. The specific example of a linear circuit with a transfer function of $1-D^2$ will continue to be used for concreteness.

Figure 2:
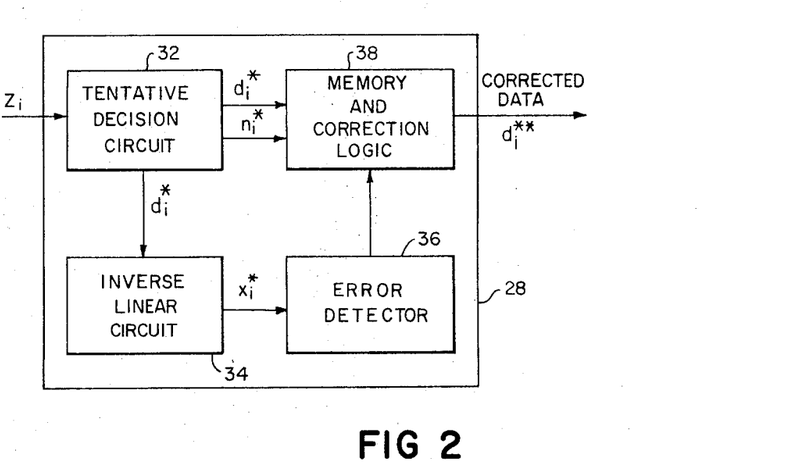
FIG. 2 is a schematic illustration of the interrelationship of various portions of an error corrector according to the invention.
Figure 3:
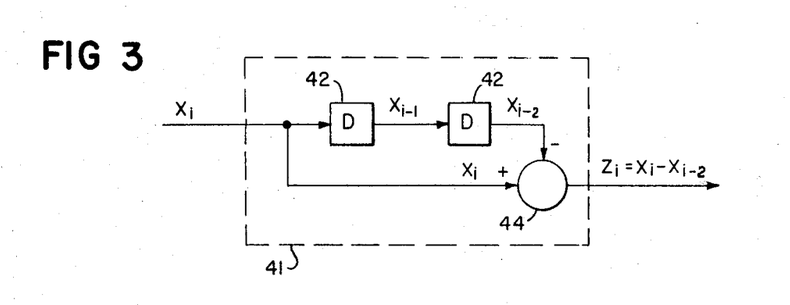
FIG. 3 is a schematic illustration of a linear circuit having a $y_i=x_i-x_{i12}$ transfer function.
Figure 4:
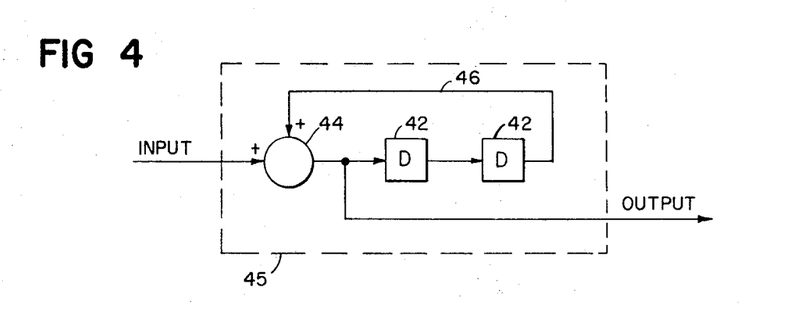
FIG. 4 is a schematic illustration an inverse linear circuit of the circuit of FIG. 3.

FIG. 3 is a schematic drawing of a circuit 41 having the equivalent transfer function of linear circuit 12 in FIG. 1. The transfer function $1-D^2$ is accomplished by means of two delay elements 42 and a summation element 44. A schematic illustration of an inverse linear circuit 45 for the circuit 41 of FIG. 3 is shown in FIG. 4. The inverse linear circuit also comprises two delay elements 42 and a summation element 44. The inverse circuit, however, includes a feedback loop 46. The output, $z_t$, of linear circuit 12 in FIG. 1 is not fed directly to the inverse linear circuit 34 of the error corrector (see FIG. 2) but instead to a tentative decision circuit 32. In the presence of noise the input to tentative decision circuit 32 is $z_t=x_t-x_{t12}+n_t=d_t+n_t$; where $d_t$ is defined as $(x_t-x_{t12})$. The tentative decision circuit 32 makes a decision, using conventional threshold circuitry, as to the correct seven-level value of the input signal. This estimate is denoted $d_{t-}=(x_t-x_{t12})$.* The tentative decision is made simply on the basis of the closest nominal signal level to the received signal-plus-noise, the assumption being that the noise is small compared to the unit interval between nominal signal levels.

As shown in FIG. 2, the tentative decision from tentative decision circuit 32 is used as the input to inverse linear circuit 34. Any decision error occurring in the input to inverse linear circuit 34 will be repeated at the output of that circuit every second output sample, because of feedback loop 46. Thus, the next even number of times after a positive decision error occurs that the correct output from inverse linear circuit 34 should be at the maximum amplitude level of the set of levels 0 to $(N-1)$, namely $(N-1)$, the presence of a positive decision error would cause the output to exceed the level and thereby violate the input constraints, since the value of the output would lie outside of the range of permissible values. This may be used to signal detection of a positive decision error. Similarly, after a negative decision error, the next time that the correct output should be zero, a minus one will be observed instead, which would indicate that a negative decision error had occurred. Thus the error detector 36 simply monitors the output of inverse linear circuit 34 and signals when a violation of the input constraints is detected. The error detector 36 can also be used to indicate the sign of the detected decision error; an excursion greater than the maximum permissible level indicates the presence of a positive decision error and an excursion to less than the minimum permissible level indicates a negative decision error. After detection of a decision error, the extreme allowable level can be substituted at that point for the value which exceeds the permissible extremes. Thus indefinite propagation of the decision error is prevented and the error detector can operate indefinitely.

It may be noted that any conventional data "scrambling" may be employed on the $x_t$ to ensure against the possibility of a long series of nonextreme data levels.

CORRECTION OF ERRORS

Once a decision error is detected, the time at which it occurred must be determined before it can be corrected. Since the decision error will be detected when it occurs or an even number of times later, only those output samples which occurred an even number of outputs prior to the current output and the current output need be considered. Furthermore, the set of outputs which are candidates for the location of the original decision error is limited in that if the detected decision error is positive the erroneous decision must have occurred since the last time that the minimum permissible data value was observed at the output of inverse linear circuit 34. If there had been a positive decision error propagating at the time such minimum value occurred, that decision error would have been added to that minimum level (in summation element 44 of FIG. 4) thereby raising the data level above the minimum permissible level. Similarly, if the detected decision error is negative the set of output samples which must be considered is limited to those occurring since the last occurrence of the maximum permissible data level.

The scheme for correction of errors is to consider all of these potentially erroneous outputs and to correct in the appropriate direction that tentative decision, $d_{t-}$, which had the largest distance from the nearest nominal signal level. Two implementations of this general correction scheme will now be considered.

Figure 5:
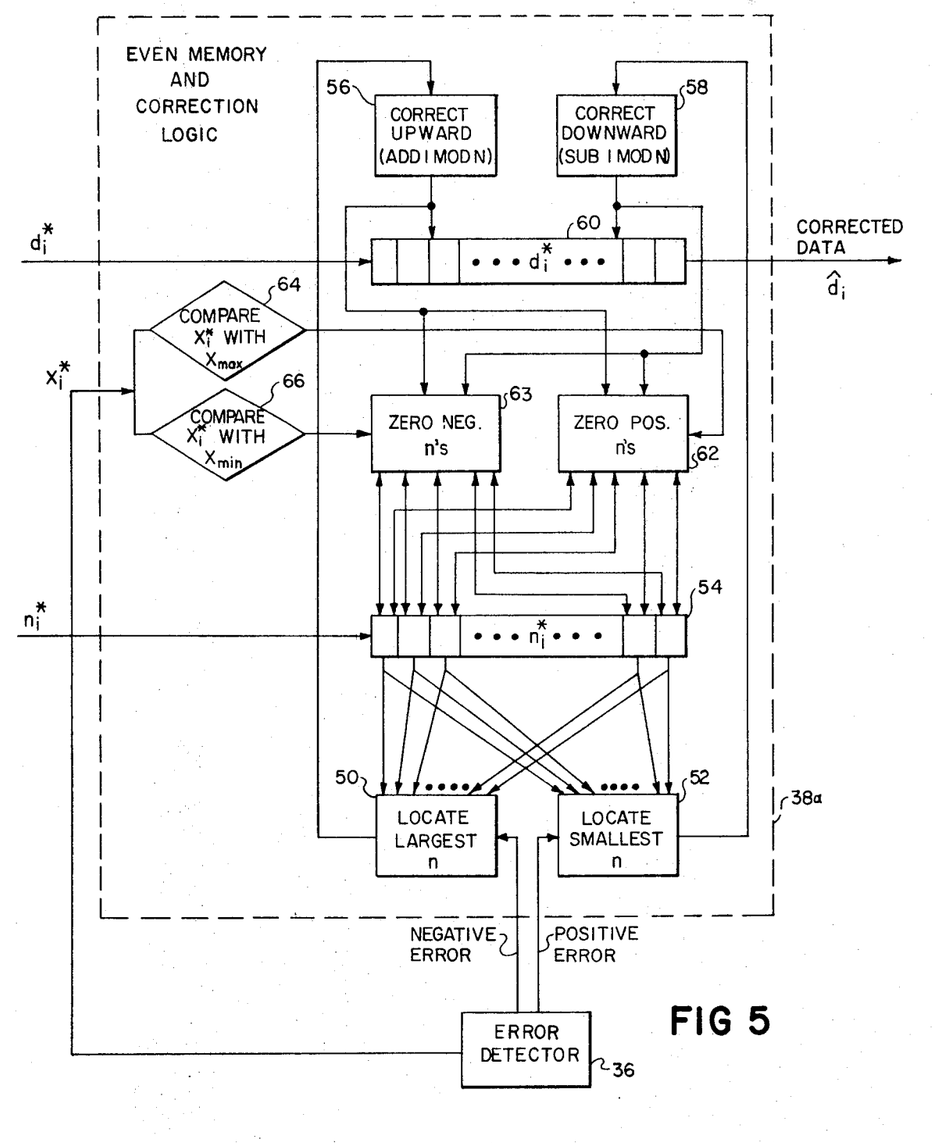
FIG. 5 is a schematic illustration of a portion of the error corrector of FIG. 2.

The first implementation is illustrated in FIG. 5. The memory 38 is used to store both tentative decisions $d_{t-}$ and apparent errors, $n_{t-}$, the latter being defined as the difference between the received signal-plus-noise $z_t$ and the closest nominal signal level $d_{t-}$. The tentative decisions and apparent errors are stored over the past B samples, where B is chosen such that it is very unlikely that a decision error would propagate without being detected for a number of samples greater than B. As discussed above, any detected decision error can have originated only in a limited set of previous output samples, where one limitation on that set is that all members of the set must have been outputs at a multiple of two time units in the past. For this reason memory 38 is so organized that "even" tentative decisions and apparent errors are stored separately from "odd" tentative decisions and apparent errors. FIG. 5 illustrates one of these portions 38a of memory 38, arbitrarily defined as the "even" portion.

A correction is made, when a decision error indication is received from error detector 36, by locating the tentative decision $d_{t-}$ which has the largest apparent error of the appropriate sign (given the sign of the detected error). As shown in FIG. 5, such an indication from the error detector 36 is delivered to monitoring circuits 50 and 52 for negative and positive decision error indications respectively. The circuits 50 and 52 monitor the entire contents of the portion of the memory 54 in which the apparent errors are stored. When either of these circuits receives a signal from the error detector 36 that a decision error of the appropriate sign has occurred, it determines the location of the apparent error having the largest magnitude of the appropriate sign. Correcting circuits 56 and 58 are connected to receive an indication of this location from monitoring circuits 50 and 52 respectively. The correcting circuit 56, when such indication is received, locates the tentative decision $d_{i-}$ having the corresponding location in the tentative decision portion of the memory 60 and corrects that tentative decision by raising its value one unit modulo 4. Similarly when correcting circuit 58 receives such an indication, the appropriate tentative decision is lowered in value by one unit modulo 4. Simultaneous with such a change in a tentative decision, the output from either correcting circuit 56 or 58 is employed to cause both positive and negative apparent errors in the apparent error portion 54 of the memory 38$a$ to be set to zero, thus placing the error corrector in a position to correct the next decision error which appears. Zeroing circuits 62 and 63 are provided to thus set the contents of each location of memory portion 54 to zero.

When an output of the inverse circuit, $x_{i-}$, occurs which is the maximum permissible data level, it is apparent that there cannot be an uncorrected negative decision error in the portion (even or odd) of the memory 38 with which the output is associated, otherwise that maximum would have been reduced by one. Therefore all positive apparent errors in the appropriate portion of the memory are set to zero. (On a negative decision error the apparent error $n_{i-}$ will be positive if the actual error $n_i$ is less than one unit, and conversely.) Similarly, all negative apparent errors in the appropriate portion of the memory are set to zero whenever an appropriate output occurs which is the minimum permissible data level. This selected zeroing is accomplished by zeroing circuits 62 and 63 in response to an indication from comparing circuits 64 or 66 that the current inverse circuit output $x_{i-}$ is equal to the maximum permissible data level or the minimum permissible data level respectively.

Figure 6:
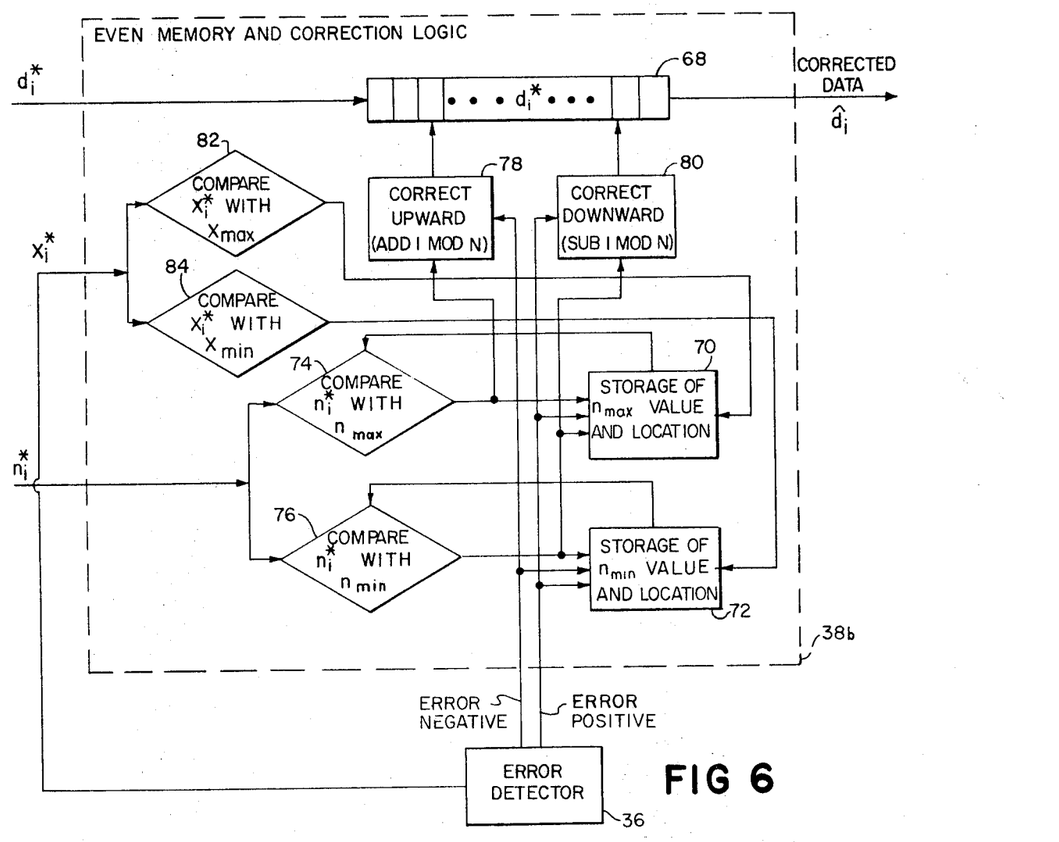
FIG. 6 is a schematic illustration of an alternative embodiment the portion illustrated in FIG. 5.

In the second implementation an even portion 38$b$ of memory 38 again stores tentative decisions in separate even and odd locations. However, instead of storing all apparent errors, only the magnitudes and locations of the largest positive and the most negative apparent error are stored for each of the two (even and odd) sequences. Thus only four apparent errors and the locations of the corresponding tentative decisions $d_{i-}$ need be stored in this implementation.

Details of this implementation are shown in FIG. 6 where 38$b$ represents the even portion of the memory and correction logic 38. The tentative decisions are stored in a portion 68 of the memory. The values and locations of the largest and smallest apparent errors of any of the apparent errors associated with stored tentative decisions ($n_{max}$ and $n_{min}$) are stored in units 70 and 72, respectively. As each new apparent error, $n_{i-}$, enters the even memory and correction logic 38$b$ it is compared in circuits 74 and 76 with the $n_{max}$ and $n_{min}$ stored in units 70 and 72. If the current apparent error exceeds the magnitude of the stored maximum value having the same sign it then replaces that value in the storage unit. In addition, the stored $n_{max}$ or $n_{min}$ associated with any tentative decision is erased as that tentative decision leaves memory portion 68.

Comparing circuits 82 and 84 test each inverse circuit output $x_{i-}$ to determine whether it equals the maximum or minimum permissible data levels respectively. Since upon the occurrence of a maximum data level there cannot be an uncorrected erroneous tentative decision having a positive apparent error, when circuit 82 detects a maximum data level it presents an indication of this fact to the storage unit 70 causing the erasure of the currently stored $n_{max}$. A detection of a minimum data level in circuit 84 causes similar erasure of the apparent error stored in unit 72.

The indication of a negative decision error, when presented by the error detector 36, causes the circuit 28 to make an upward correction by one unit modulo 4 in the tentative decision $d_{i-}$ associated with the stored $n_{max}$. Such an indication simultaneously causes the erasure of the apparent errors stored in storage units 70 and 72. Similarly an indication of a positive decision error causes a downward correction by circuit 80 in the tentative decision associated with the stored $n_{min}$ and an erasure of the contents of storage units 70 and 72.

GENERALIZATION

The foregoing description of a preferred embodiment may be viewed as a special case of the general concept according to the invention. The following discussion will indicate to those skilled in the art the more general nature of the invention herein.

The previous discussion has been concerned with a 4−level input signal; generalization to any number of levels is implicit in the description.

The extension of the foregoing to the case of a system with a partial response of the form $1 \pm D^n$ is much easier to understand than the full generalization and therefore is treated first. To adapt the discussion to the case of $1 \pm D^n$ FIGS. 3 and 4 need only to be changed as follows: the number of delay elements 42 in each FIG. is changed to "$n$" and the signs at the inputs to the summation elements 44 are inverted if the response is $1+D^n$ rather than $1-d^n$.

The number of separate memories and correction logics of the types shown in FIG. 5 or FIG. 6 becomes $n$ instead of 2. Finally, if the response is of the form $1+D^n$ rather than $1-D^n$, all signs must be effectively inverted every $n^{th}$ signal in FIG. 5 or FIG. 6.

In general, an integer-valued partial response channel is characterized by its time-discrete (sampled-data) impulse response $h_0, h_1, h_2, \ldots, h_n$ where the $h_i$ are integers, represented as a polynomial in the delay operator D:

$$h(D) = h_0 + h_1 D + h_2 D^2 + \ldots + h_n D^n.$$

This means that if the input is $x(D)$, the output of the channel is $z(D) = x(D)h(D) + n(D)$, where $n(D)$ is defined as $n(D) \equiv z(D) x(D)h(D)$; that is, $n(D)$ includes everything in the output that is not equal to the input sequence passed through the desired response $h(D)$, including both true channel noise and any undesired intersymbol interference caused by the true channel response not being exactly $h(D)$.

Figure 7:
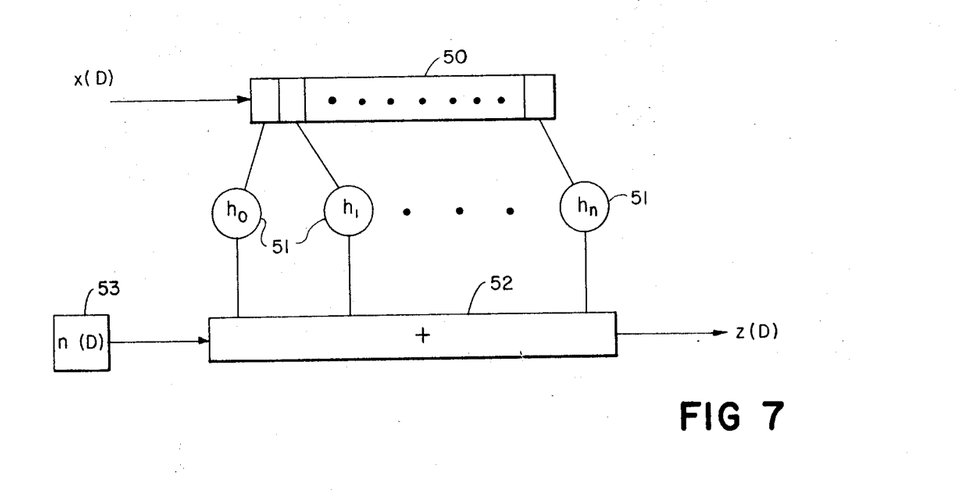
FIG. 7 is a schematic illustration of a model of a generalized partial response channel.

In analogy with convolutional codes, the degree $n$ of the maximum term in $h(D)$ is called the "constraint length" of the code. The partial response channel can therefore be modelled as in FIG. 7, as a shift register 50 (tapped delay line) of $(n+1)$ stages, with $x(D)$ as the input, with tap coefficients $h_i$ (elements 51), and with $z(D)$ the output (after the addition of noise 53 in summation device 52) as in FIG. 5.

Only digital integer-valued inputs are considered; that is, $x(D)$ takes on one of $m$ discrete integer values at any time. The shift register elements then need take on only one of $m$ states, and the whole model becomes that of a finite-state machine, similar to a convolutional encoder.

As a further generalization, the inputs $x_i$ may be subject to additional constraints; certain levels within the prescribed finite range may be prohibited, certain sequences of levels may be prohibited, and so forth.

If both the inputs and the channel are representable as integer-valued, then the desired outputs, $d(D) = x(D)h(D)$, are also integer-valued. If the noise $n(D)$ has samples which are usually small compared to a unit interval, then the tentative decisions $d^*(D)$ may be made on the basis of channel outputs $z(D)$ with substantial reliability. The apparent noise, defined as $n^*(D) = z(D) - d^*(D)$, will be an indicator of the decision reliability for any reasonable noise statistics.

If the tentative decisions $d^*(D)$ are passed through a circuit which is the inverse linear circuit to $n(D)$, namely the one with transfer function $h^{11 \, 6 \, 1}(D)$, then as long as there are no errors $d^*(D) = d(D) = x(D)h(D)$, and the output, $x^*(D) = d^*(D)h^{11 \, 6 \, 1}(D)$, of such an inverse linear circuit will be $x^*(D) = d(D)h^{11}(D) = x(D) h(d)h^{11}(D) = x(D)$; that is, the original input. Therefore the output $x^*(D)$ will satisfy all constraints satisfied by the original input. Now if an error occurs, say at time zero, in the positive direction, so that $d^*(D) = d(D) +1$, then $x^*(D) = d^*(D)h^{-1}(D) = [1+d(D)] \; h^{11}(D) = h^{11}(D) + x(D)$, so that the inverse circuit output has the inverse circuit impulse response superposed on the true input $x(D)$. Since $h(D)$ is finite, $h^{11}(D)$ is infinite, so that we may be sure that at least the finite-range constraints on $x(D)$, and perhaps other constraints, will sooner or later not be satisfied by $x^*(D)$. When such a failure occurs, a correction may be made at any point such that the corrected output sequence $d^{}(D)$ is such that $x^{}(D) = d^{}(D) h^{11}(D)$ is now a possible input sequence satisfying all constraints, with the choice of which such correction to make guided by stored reliability information from the apparent noises $n^{}(D)$, as well perhaps as by the probabilities of various input sequences. At the same time the inverse linear circuit should be forced to the state it would have been in had $d^{**}(D)$ been its input rather than $d^{*}(D)$. If the correction was not properly made, errors may continue to propagate in the inverse linear circuit, which will then continue to make false corrections at subsequent times until it gets back to the state it would have been in had all tentative decisions been correct. This general circuit is illustrated in FIG. 8.

Figure 8:
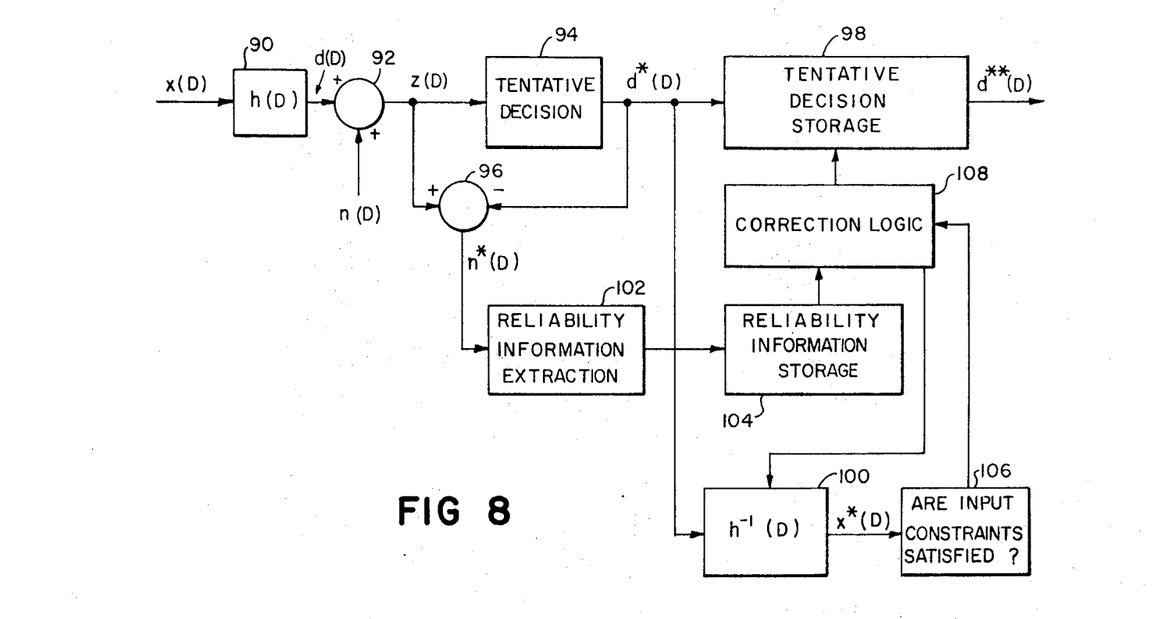
FIG. 8 is a schematic illustration of a generalized error corrector.

As shown in FIG. 8, the input sequence $x(D)$ passes through an idealized channel 90 having the transfer function $h(D)$. The model requires a summation element 92 for the addition of noise $n(D)$ to the desired output $d(D)$ yielding the actual output $z(D)$. Tentative decision circuit 94 accepts the $z(D)$ sequence and puts out decisions $d^{*}(D)$ to combination element 96, memory 98, and the inverse linear circuit 100. The combination element 96 combines the $z(D)$ and $d^{*}(D)$ sequences to produce a sequence $n^{*}(D)$ of apparent noises or apparent errors. From the $n^{*}(D)$ sequence circuit 102 extracts reliability information which is stored in memory 104.

The output $x^{*}(D)$ of the inverse circuit 100 is tested in circuit 106 for satisfaction of the input constraints. Correction logic 108 corrects a stored tentative decision, when it receives an indication of a constraint violation from circuit 106, using reliability information from memory 104.

A further generalization involves consideration of detection logics not using an inverse linear circuit, but using the input constraints in other ways.

The constraints on the input sequence $x(D)$ transform into constraints on the desired output sequence $d(D)$ through the relation $d(D) = x(D)h(D)$. For example, it is well known that when the inputs are two-valued and $h(D) = 1-D$, the desired output has three values representable as 1, 0, and $-1$, and that the output sequence must have an occurrence of a $-1$ between every two occurrences of $+1$'s, and vice versa. This constraint on the output sequence generalizes in the obvious way to a $1-D^2$ or $1-D^n$ response. Failure to satisfy such a constraint on the output sequence could be used, instead of the inverse linear circuit technique, in the correction technique described herein: If two $+1$'s are observed in succession, then a positive decision error is detected, while if two $-1$'s are observed before any $+1$, then a negative decision error is detected. In both cases the error has occurred somewhere in the span defined by the two 1's whether plus or minus.

From the foregoing it is apparent that the invention herein embraces embodiments other than the preferred embodiment which has been described in detail and that these are within the following claims.

What is claimed is:

1. In a modem or similar device in which there are time-discrete data samples representable as the sum of a desired output plus noise, said desired output being representable as the output of a linear sampled-data circuit with integer-valued impulse response when the input is a sequence of integer-valued input samples subject to predetermined constraints, said noise being likely to be small compared to a unit interval, an error corrector comprising:
a tentative decision circuit responsive to said data samples and having as outputs integer-valued tentative decision signals and signals indicating the reliability of said decisions;
memory means for storage of both a predetermined number of successive tentative decision signals, and of reliability information derived from said reliability-indicating signals, said reliability information comprising at least an indication of the location of the least reliable of said tentative decision signals;
a detection circuit responsive to said tentative decision signals for detecting the occurrence of errors in said tentative decision signals on the basis of said constraints, said detection circuit providing output signals indicative of the presence or absence of tentative decision errors;
and correction logic responsive to said detection circuit output signals and to said stored reliability information for determining the probable location, magnitude, and polarity of said tentative decision errors, with means for implementing correction of said errors in said tentative decision signals.

2. The device of claim 1 wherein said detection circuit comprises: a linear circuit which is the inverse of said first-mentioned linear circuit, said inverse circuit connected to receive as inputs said tentative decision signals; detection logic responsive to the outputs of said inverse circuit to determine the presence or absence of decision errors according to whether the outputs satisfy said constraints; and means to prevent the propagation of a detected decision error in said inverse circuit.

3. The device of claim 2 wherein said input constraints are that input values are restricted to a finite predetermined range of integers and in which said detection circuit determines the presence or absence of decision errors according to whether the outputs of said inverse linear circuit fall inside or outside said finite range.

4. The device of claim 3 wherein said means to prevent propagation comprises circuitry connected to cause replacement of any output of said inverse circuit for which input finite range constraints are not satisfied with a substituted output, said substituted output having the closest integer value to said output which satisfies said input finite range constraints.

5. The device of claim 1 wherein said reliability-indicating signals include the magnitudes of the apparent errors in said data samples, said apparent errors being equal to the differences between said data samples and the levels associated with the corresponding tentative decision signals.

6. The device of claim 5 wherein said reliability-indicating signals include also the signs of said apparent errors and said stored reliability information comprises at least signals indicating the locations of the largest positive and negative apparent errors.

7. The device of claim 6 wherein said stored reliability information comprises all of said apparent errors associated with all of said tentative decision signals stored in said memory means.

8. The device of claim 1 wherein said input constraints are that input values are restricted to a predetermined finite range of intergers.

9. The device of claim 1 wherein said integer-valued impulse response is defined by a transfer function of the form $1 \pm D^n$, where $n$ is an integer.

10. The device of claim 1 wherein said tentative decision signals comprise a plurality of output sets, each set comprising signals which are affected by errors only in prior signals of the same set, and wherein said memory means comprises a like plurality of separate portions for the separate storage of reliability information corresponding to each of said plurality of sets.

11. The device of claim 10 wherein said plurality of output sets and said plurality of memory portions is two.

UNITED STATES PATENT OFFICE
CERTIFICATE OF CORRECTION

Patent No. 3,613,077                     Dated October 12, 1971

Inventor(s) George David Forney, Jr.

It is certified that error appears in the above-identified patent and that said Letters Patent are hereby corrected as shown below:

Col. 1, line 28, correct equation to: $z_i = x_i - x_{i-2}$

Col. 1, line 73, after "errors" insert --associated with the stored tentative decisions; the apparent errors--;

Col. 2, line 13, correct "$x_{112}$" to --$x_{i-2}$--

Col. 2, lines 26 and 44, corect "$x_{112}$" and "$x_{11}$" respectively to --$x_{i-2}$-- both instances;

Col. 3, line 18, correct "(d)" to --(D)--

Col. 3, line 22, correct "$g^{11}$" to --$g^{-1}$--

Col. 3, line 22, omit "2"

Col. 3, line 49, correct "$x_{112}$" to --$x_{i-2}$--

Col. 3, line 50, correct "$x_{112}$" to --$x_{i-2}$--

Col. 3, line 53, correct "$x_{112}$" to --$x_{i-2}$--

Col. 3, line 67, correct second "the" to --that--;

Col. 4, line 40, correct "$d_i$-" to --$d_i^*$--

Col. 4, line 45, correct "$d_i$-" to --$d_i^*$--

Col. 4, line 46, correct "$n_i$-" to --$n_i^*$--

Col. 4, line 48, correct "$d_i$-" to --$d_i^*$--

Col. 4, line 64, correct "$d_i$-" to --$d_i^*$--;

Continued

UNITED STATES PATENT OFFICE
CERTIFICATE OF CORRECTION

Patent No. 3,613,077          Dated October 12, 1971

Inventor(s) George David Forney, Jr.          - 2 -

It is certified that error appears in the above-identified patent and that said Letters Patent are hereby corrected as shown below:

Col. 5, line 3, correct "$d_i$-" to --$d_i^*$--

Col. 5, line 16, correct "$x_i$-" to --$x_i^*$--

Col. 5, line 23, correct "$n_i$-" to --$n_i^*$--

Col. 5, line 31, correct "$x_i$-" to --$x_i^*$--

Col. 5, line 41, correct "$d_i$-" to --$d_i^*$--

Col. 5, line 48, correct "$n_i$-" to --$n_i^*$--

Col. 5, line 56, after "each" insert --incoming--

Col. 5, line 57, correct "$x_i$-" to --$x_i^*$--

Col. 5, line 70, correct "$d_i$-" to --$d_i^*$--;

Col. 6, line 18, correct "-$d^n$" to -- -$D^n$ --

Col. 6, line 31, correct "z(D)x(D)h(D)" to --z(D) - x(D)h(D)--

Col. 6, line 57, correct "z(D)" to --x(D)--

Col. 6, line 62, correct "n(D)" to --h(D)--

Col. 6, line 63, correct "$h^{116}$ $^1$(D)" to --$h^{-1}(D)$--

Col. 6, line 64, correct "$x^*(D)=d^*(D)h^{116}$" to --$x^*(D)=d^*(D)h^{-1}$--

UNITED STATES PATENT OFFICE
CERTIFICATE OF CORRECTION

Patent No. 3,613,077                    Dated October 12, 1971

Inventor(s) George David Forney, Jr.            - 3 -

It is certified that error appears in the above-identified patent and that said Letters Patent are hereby corrected as shown below:

Col. 6, line 65, correct "$^1(D)$" to --$(D)$--

Col. 6, line 65, correct "$x^*(D)=d(D)h^{11}$" to --$x^*(D)=d^*(D)h^{-1}$--

Col. 6, line 66, correct "$D)=x(D)h(d)h^{11}(D)=x(D)$" to --$D)=x(D)h(D)h^{-1}(D)=x(D)$--

Col. 6, line 70, correct "$h^{11}(D)=h^{11}(D)+x(D)$" to --$h^{-1}(D)=h^{-1}(D)+x(D)$--

Col. 6, line 73, correct "$h^{11}(D)$" to --$h^{-1}(D)$--;

Col. 7, line 3, correct "$h^{11}(D)$" to --$h^{-1}(D)$--;

Col. 8, line 35, after "which" insert --said--.

Signed and sealed this 7th day of November 1972.

(SEAL)
Attest:

EDWARD M. FLETCHER, JR.                 ROBERT GOTTSCHALK
Attesting Officer                       Commissioner of Patents